Figures 1, 2, 12:
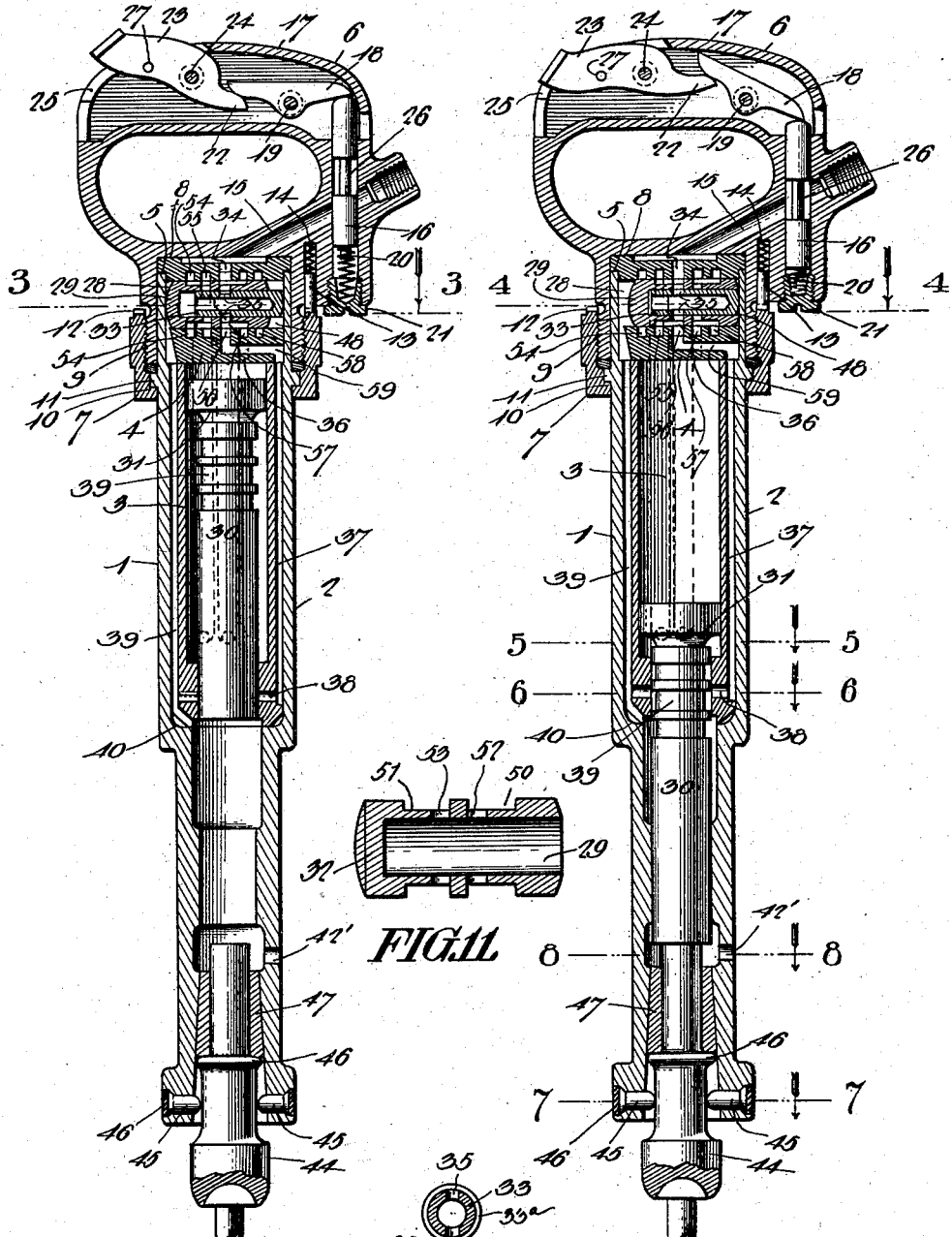

No. 712,438.  
Patented Oct. 28, 1902.

C. H. SHAW.
PNEUMATIC HAMMER.
(Application filed July 25, 1901.)

(No Model.)  
2 Sheets—Sheet 1.

Witnesses  
Charles H. Shaw, Inventor

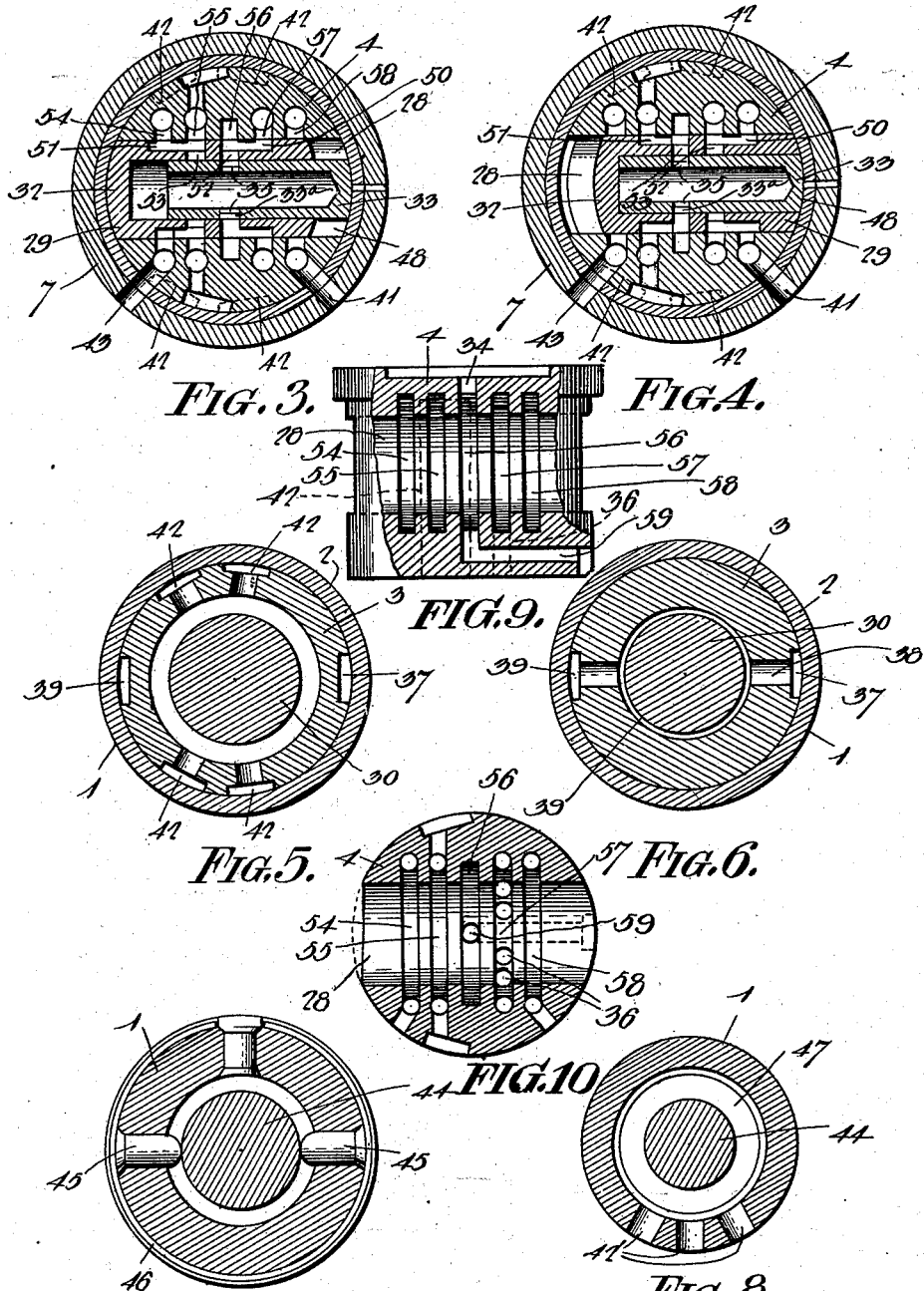

UNITED STATES PATENT OFFICE.

CHARLES HENRY SHAW, OF DENVER, COLORADO.

PNEUMATIC HAMMER.

SPECIFICATION forming part of Letters Patent No. 712,438, dated October 28, 1902.

Application filed July 25, 1901. Serial No. 69,702. (No model.)

*To all whom it may concern:*

Be it known that I, CHARLES HENRY SHAW, a citizen of the United States, residing at Denver, in the county of Arapahoe and State of Colorado, have invented a new and useful Pneumatic Hammer, of which the following is a specification.

The invention relates to improvements in pneumatic hammers.

The object of the present invention is to improve the construction of pneumatic hammers and to provide a simple, strong, and inexpensive one in which there will be no resistance by the air under pressure to the forward or outward movement of the plunger, whereby the force of the blow will be increased.

The invention consists in the construction and novel combination and arrangement of parts hereinafter fully described, illustrated in the accompanying drawings, and pointed out in the claims hereto appended.

In the drawings, Figure 1 is a longitudinal sectional view of a pneumatic hammer constructed in accordance with this invention, the plunger being at the inner end of the casing preparatory to delivering a blow. Fig. 2 is a similar view showing the plunger at the outer end of the casing after a blow has been delivered. Fig. 3 is a transverse sectional view on the line 3 3 of Fig. 1. Fig. 4 is a similar view on the line 4 4 of Fig. 2. Fig. 5 is a sectional view on the line 5 5 of Fig. 2. Fig. 6 is a sectional view on the line 6 6 of Fig. 2. Fig. 7 is a transverse sectional view on the line 7 7 of Fig. 2. Fig. 8 is a sectional view on the line 8 8 of Fig. 2. Figs. 9 and 10 are detail views of the valve-casing. Fig. 11 is a longitudinal sectional view of the valve. Fig. 12 is a transverse sectional view of the valve-plug.

Like numerals of reference designate corresponding parts in all the figures of the drawings.

1 designates a cylindrical main casing having an enlarged upper portion 2 and provided therein with longitudinal apertures, which are preferably formed by grooves in an inner shell or lining 3, which is secured within the enlarged portion 2 of the casing or cylinder 1; but the said passages may be formed in any suitable manner. The casing is provided between its ends with an interior shoulder formed by enlarging its upper portion, and the inner lining or shell has its inner or lower portion seated against the said shoulder, and it is retained in position by a valve-casing 4, fitted in the upper or inner end of the main casing or cylinder 1 and provided at its outer end with an annular shoulder 5, which fits against the outer end of the main casing or cylinder. The valve-casing is retained in the main casing or cylinder by a handle 6 and a nut 7. The handle 6 is provided with a socket 8, which fits over the inner or upper end of the main casing or cylinder and which is provided with exterior screw-threads 9. These screw-threads 9 are engaged by the nut 7, which is provided with an annular flange 10, adapted to engage an annular rib 11, located on the exterior of the main casing or cylinder, adjacent to the upper end thereof, as clearly shown in Figs. 1 and 2. The nut is introduced on the main casing or cylinder from the inner or lower end thereof and is moved upward on the same until its interior annular flange 10 engages the rib 11. The nut is designed to be provided with a suitable wrench-receiving face, and it has notches or teeth at its edge 12, which are adapted to be engaged by a spring-actuated bolt 13. The spring-actuated bolt 13 is mounted in a socket or bore of an enlargement of the handle, and its inner end is engaged by a coiled spring 14, which is seated against the wall at the inner end of the bore or socket. The spring-actuated bolt is adapted to lock the nut in engagement with the handle, and it prevents the nut from becoming loosened by the vibration incident to the operation of the pneumatic hammer. The handle is provided with a transversely-disposed inlet passage or duct 15 for the introduction of air, gas, or other fluid under pressure, and disposed transversely of this inlet passage or duct is a throttle-valve 16, arranged to close the duct or passage and extending into the grip 17 of the handle, which is hollow, and the said throttle-valve is located at one end of the hollow grip in position to be engaged by an inner lever 18. The lever 18 is fulcrumed between its ends on a suitable pivot 19, and its outer arm engages the throttle-valve, which is held against the lever by a coiled spring 20. The coiled spring 20, which is arranged in the bore or opening for the valve, is retained therein by a screw-plug 21, and its upper end receives a reduced portion of the valve, as clearly shown in Fig. 1. The inner end of the lever 18 is engaged by a projection 22 of an operating-lever 23, fulcrumed on a suitable pivot 24 and extending outward through a slot 25 of the hollow grip, whereby it is adapted to be readily depressed by the operator without removing the hand from the grip of the handle. The operating-lever is adapted to be moved inward to the position illustrated in Fig. 2 of the accompanying drawings, and the valve is moved outward by this operation to carry a reduced portion 26 to the duct or inlet-passage to permit the compressed air or other fluid under pressure to enter the hammer. The operating-lever may be provided at its outer end with a suitable button or head, and the outward movement of its outer arm is limited by a suitable stop 27, arranged to engage the inner face of the hollow grip. The screw-plug, which receives the coiled spring 20, is preferably provided with a socket or recess to form a seat for such spring.

The valve-casing is provided with a transverse aperture 28, in which is arranged an automatic valve 29, which is adapted to be reciprocated automatically by the means hereinafter described when the plunger 30 reaches the limit of its outward movement to introduce the compressed air beneath a shoulder 31 to return the plunger to its initial position. The automatic transversely-disposed valve is hollow, being open at one end and provided with a closed end 32 of greater area than its interior, and the said hollow valve receives a hollow plug 33, open at its inner end and closed at its outer end. The air enters the valve-casing at the top through a port 34, and it maintains at all times a constant pressure within the hollow plug and the hollow valve. This internal pressure operates to move the automatic valve outward away from the closed end of the plug to maintain the said automatic valve in the position illustrated in Fig. 1 of the accompanying drawings when there is no pressure on the exterior of the closed end of the valve. As soon as the hammer arrives at the end of its outward movement the pressure of the air is applied to the exterior of the closed end of the valve, and as the area of such closed end is greater than the area of the interior of the valve the latter will be moved inward from the position shown in Fig. 1 to that illustrated in Fig. 2. The valve-plug 33 is provided with an exterior annular groove 33ª, and it has apertures 35, located at the annular groove and communicating with its interior, as clearly illustrated in Fig. 12 of the accompanying drawings. The automatic valve 29 is provided with exterior annular recesses or grooves 50 and 51, and it is provided thereat with openings 52 and 53, communicating with the interior of the valve and with the annular recesses or grooves 50 and 51 and adapted to alternately register with the feed-port 34. The valve-casing is provided with interior annular grooves or passages 54, 55, 56, 57, and 58, the annular groove 56 being arranged at the center of the valve-casing and communicating at the top with the feed-port 34 and at the bottom with a passage 59, which communicates with a longitudinal passage 37 of the main casing. The annular grooves 54 and 55 are located at one side of the center of the valve-casing, and the other grooves 57 and 58 are located at the opposite side of the center, as clearly illustrated in Figs. 9 and 10 of the drawings. When the valve 29 is at the limit of its outward movement, as illustrated in Fig. 1, the compressed air enters the feed-port 34 and passes through the openings 52 of the valve-casing and through the openings or ports 35 of the valve-plug and enters the bottom transverse passage 59. It also passes through apertures or ports 36, arranged at the bottom of the annular groove 57 and extending through the bottom of the valve-casing and communicating with the main casing. The compressed air is thus admitted to the upper end of the plunger, which is moved from the position shown in Fig. 1 to that illustrated in Fig. 2. During this operation air-pressure is maintained in the longitudinal passage 37, which extends from the valve-casing to an intermediate port 38, located adjacent to the shoulder formed by enlarging the upper portion of the main casing and communicating with an annular groove 39 of the plunger. This establishes a communication between the longitudinal side passage 37 and a similar side passage 39, which extends from the shoulder 40 of the main casing to the valve-casing and introduces the compressed air into the transverse aperture 28 at the closed end of the automatic valve. The area of the exterior of the closed end of the automatic valve being greater than the area of the interior of such end results in a greater pressure on the exterior, and this excess of pressure carries the automatic valve from the position illustrated in Fig. 1 to that shown in Fig. 2. This movement of the automatic valve shuts off the supply of air to the upper end of the main casing or cylinder and establishes a communication between the inner or upper end of the cylinder and the exterior or outside atmosphere to permit the air to exhaust on the return movement of the plunger. The air from the interior or upper portion of the main casing or cylinder exhausts through the openings 36 and passes into the annular groove 57 of the valve-casing and then into the annular groove or recess 50 of the automatic valve, which communicates with the annular groove 58. The annular groove 58 communicates with an exhaust-port 41, through which the air escapes and which is opened by the inward or backward reciprocation of the automatic valve, as clearly illustrated in Fig. 4 of the drawings. The inward movement of the automatic valve also admits compressed air into the longitudinal passages 42, which conduct the compressed air to points beneath the shoulder 31, formed by the head or enlarged upper end of the plunger. The annular groove 55 of the valve-casing communicates with the annular groove or recess 51 at this time and receives the compressed air from the feed-port 34 and is connected with the longitudinal passages 42 by oppositely-disposed ports or passages 60, arranged as clearly illustrated in Fig. 4, and extending from the said annular groove 55 to the upper ends of the said passages 42. This causes a slow inward movement of the plunger, which is carried from the position shown in Fig. 2 to that illustrated in Fig. 1, whereby the lower end of the longitudinal passage 39 is opened and put in communication with the lower end of the main casing or cylinder. The main casing or cylinder is provided near its lower end with exhaust-ports 42', which when the plunger is moved inward permits the compressed air to exhaust from the lower portion of the main casing and from the longitudinal passage 39, thereby relieving the outer closed end of the automatic valve of exterior pressure and permitting the interior pressure to carry the valve outward from the position shown in Fig. 2 to that illustrated in Fig. 1. This movement of the valve closes the exhaust-port 41 and opens an exhaust-port 43, which communicates with the annular groove 54 and facilitates the reduction of pressure in the hammer, so that there will be no resistance to the forward or outward movement of the plunger, as is the case with hammers maintaining a constant pressure on the shoulder 41. By this construction and operation a blow of increased power is obtained. This outward movement of the automatic valve returns the parts to their initial position and establishes a communication between the source of supply and the upper end of the main casing or cylinder to again drive the plunger forward or outward. The annular space 48 at the open end of the automatic valve communicates with the exterior of the casing to relieve the said open end of the valve of pressure, so that there will be no resistance at this end of the valve other than atmospheric pressure, and any suitable aperture may be provided for this purpose.

The pneumatic hammer, which may be employed for a variety of purposes, as will be readily understood, is adapted to receive a tool 44, which is held in place by a pair of oppositely-disposed steel pins 45, located at the lower end of the casing, in suitable apertures thereof, and engaged by a spring 46. The spring 46, which is circular, is arranged in a groove of the lower end of the hammer, and the pins, which are provided at their outer ends with heads, have rounded inner ends and engage the tool, as clearly shown in Figs. 1 and 2. The tool is provided between the ends of its shank with a rib 46, which is rounded, as shown, to permit the tool to be readily withdrawn from and placed in the pneumatic hammer when the proper pressure is applied. The rounded rib is adapted to engage the rounded ends of the pins to force the same outward, and the inner portion of the shank of the tool is received within a sleeve 47. The heads of the pins are received within enlarged portions of the apertures of the casing or cylinder 1, and they limit the inward movement of the pins.

What I claim is—

1. The combination of a casing, a reciprocating plunger, a valve-casing provided with an aperture and having annular grooves, a reciprocating automatically-operating valve provided with recesses and having ports or openings, and a valve-plug loosely fitted in the valve-casing, substantially as described.

2. The combination of a casing, a reciprocating plunger, a valve-casing having an aperture provided with interior annular grooves, said valve-casing being also provided with ports or openings, an automatic valve arranged within the valve-casing and having exterior grooves and provided with ports or openings, and a hollow valve-plug fitted in the said valve and closed at its outer end and provided with openings, substantially as described.

3. The combination of a casing provided with the longitudinal passages 37 and 39 and provided with an exhaust-port 42', arranged at the lower portion of the casing and adapted to communicate with the passage 39, said casing being also provided with longitudinal passages 42, communicating at their inner ends with the upper portion of the casing, a plunger provided with a shoulder and having an annular groove or recess, a hollow reciprocating valve having one of its ends closed and arranged at the upper or outer end of the passage 39, a plug closing the other end of the automatic valve and reducing the interior area of the same, and means for controlling the passage of air to the casing, substantially as described.

4. The combination of a casing provided with longitudinal passages, a plunger, a valve-casing provided with an aperture and having annular grooves therein communicating with the said passages, a reciprocating automatically-operating valve having exterior recesses and provided with ports or openings, a valve-plug, and means for controlling the passage of air to the casing, substantially as described.

5. The combination of a casing provided with longitudinal passages 37, 39 and 42, and having upper and lower exhaust-ports, a reciprocating plunger having an annular groove and provided with a shoulder, a valve-casing having an aperture and provided with interior annular grooves, said valve-casing being also provided with ports or openings, an automatic valve mounted in the valve-casing and having exterior grooves and provided with ports or openings, and a hollow valve-plug fitting in the valve and provided with openings, substantially as described.

In testimony that I claim the foregoing as my own I have hereto affixed my signature in the presence of two witnesses.

CHARLES HENRY SHAW.

Witnesses:
C. F. SCHOFIELD,
M. B. FISCHER.